Figure 1:
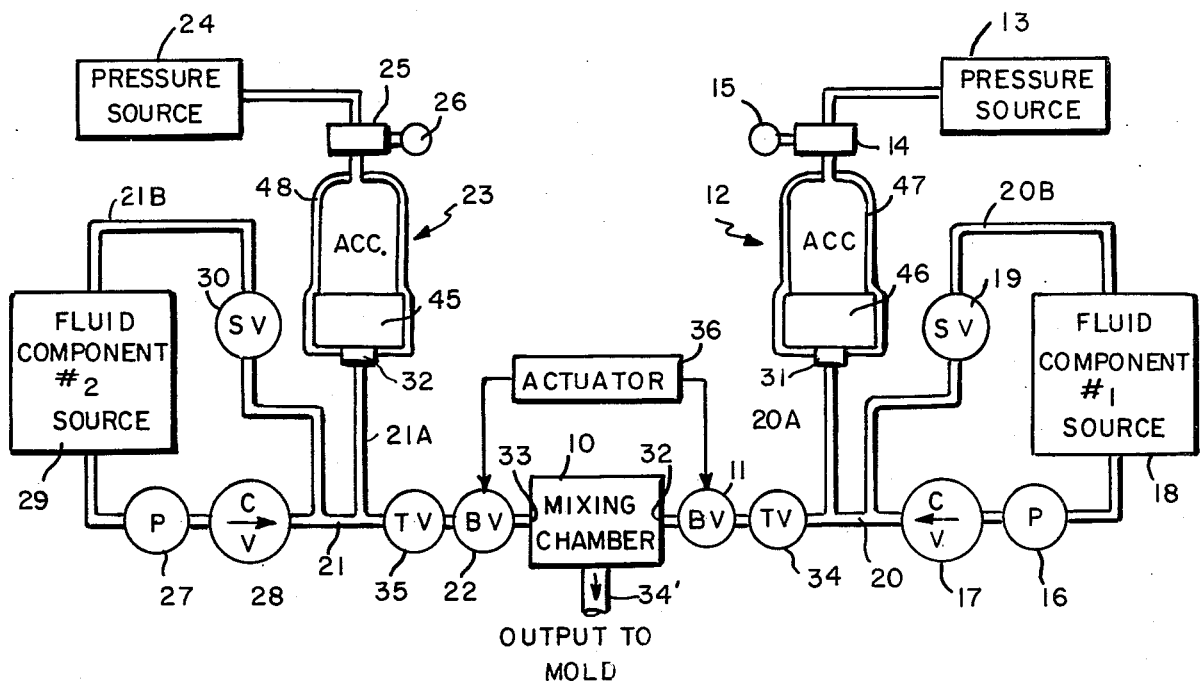

United States Patent [19]
Suh et al.

[11] 4,019,652
[45] Apr. 26, 1977

[54] FLUID DELIVERY AND MIXING SYSTEMS
[75] Inventors: Nam P. Suh, Sudbury; Salvatore C. Malguarnera, Medford; Frederick H. Anderson, Reading, all of Mass.
[73] Assignee: Massachusetts Institute of Technology, Cambridge, Mass.
[22] Filed: Nov. 5, 1975
[21] Appl. No.: 628,965
[52] U.S. Cl. .................................. 222/1; 222/135; 222/145; 222/335
[51] Int. Cl.² .......................................... B67D 5/60
[58] Field of Search .......... 222/134, 135, 145, 335, 222/1

[56] References Cited
UNITED STATES PATENTS 2,946,488  7/1960  Kraft ................................. 222/134
3,212,676  10/1965  Trumbull et al. ............... 222/335 X Primary Examiner—Stanley H. Tollberg
Assistant Examiner—Hadd Lane
Attorney, Agent, or Firm—Arthur A. Smith, Jr.; Robert F. O'Connell

[57] ABSTRACT

A fluid delivery and mixing method and apparatus for mixing at least two fluids wherein the fluids are stored under pressure in separate accumulators and are supplied substantially simultaneously to a mixing chamber, the pressure decay characteristics of each of the accumulators being controlled to have substantially the same shape. The characteristics of the fluid components, the size of the input ports to the mixing chamber and the pre-determined pressures to which the fluids in the accumulators are charged being selected so that the ratio of the flow rates by weight of the fluids at the input ports is a constant and so that the momenta of the fluids at the input ports are equal.

13 Claims, 4 Drawing Figures

FLUID DELIVERY AND MIXING SYSTEMS

The Government has rights in this invention pursuant to NSF Cooperative Agreement CG-00006 awarded by the National Science Foundation.

INTRODUCTION

This invention relates generally to fluid delivery and mixing systems and, more particularly, to systems for mixing plastic fluids for delivery and use in a liquid injection molding apparatus.

BACKGROUND OF THE INVENTION

In fluid mixing systems, particularly where plastic materials are being mixed for use in a liquid injection molding apparatus, it is often desirable that large amounts of the mixed plastic be delivered to the molds in a relatively short time period. Thus, a typical present day apparatus is capable of delivering as high as 10 to 12 lbs. of a mixture of liquid plastics to a mold in 4 to 5 seconds. Such machines are relatively large in size and are costly to manufacture and are limited in their shot capacities, that is, their abilities to deliver more than 10 to 12 pounds of liquid plastic to a mold over a reasonably short time period. In many applications, however, it is desirable that apparatus having shot capacities much higher than 10 to 12 pounds be available and that the total amount thereof be delivered in much shorter time periods, at higher flow rates. It is further desirable that the manufacturing costs and the size of apparatus which can deliver large amounts of mixed fluid plastics at high flow rates be reduced in comparison with presently available apparatus so that smaller initial capital investments are required. Moreover, the apparatus should also be capable of being installed and used with much less difficulty and greater reliability than present apparatus. Further, such apparatus should be capable of handling a wide range of different fluids having a wide range of viscosities. Moreover, such apparatus should be capable of having its operation adjustable so that variable output flow rates can be achieved in a convenient manner.

In addition, currently available equipment is normally designed to provide a specific shot capacity which is not readily adjustable to provide a range of shot sizes. Thus, machines having large shot capacities cannot be easily adapted for use in providing smaller shot capacities, and vice-versa, so that different machines have to be available for different applications, a factor which increases the overall operating costs of a plant in which it is desired to make a variety of articles each requiring different shot capacities. Accordingly, it is desirable that such apparatus provide for adjustability of the shot capacities thereof over a reasonable range thereof.

In summary, present day equipment, particularly for providing realtively high shot capacities, does not adequately fulfill all of the above requirements, such apparatus being particularly expensive not only because of high initial costs of installation but also because of high operating costs which are due to the relatively high power requirements thereof.

BRIEF SUMMARY OF THE INVENTION

This invention provides a fluid delivery and mixing system which has relatively low manufacturing and installation costs, as well as relatively low operating power requirements. The system of the invention provides good mixing properties and high flow rates together with a high shot capacity and a capability for adjustable operation over a wide range of flow rates and shot capacities with fluid materials having relatively wide ranges of different viscosities.

In accordance therewith, each fluid component is supplied to an accumulator device where it is retained at a desired preselectable pressure prior to its delivery to a mixing device. When mixing of the fluid components is required, fast acting valves positioned between the accumulators and the mixing device are opened so that the fluid components are delivered by the accumulators through the valves to the mixer in a manner such that the pressure drop from the accumulator to the input ports of the mixing device is relatively small. The pressures in the accumulators are arranged so that the momenta of the two incoming fluid streams at the mixing device are substantially equal and so that the ratio of the flow rates by weight of the components which are to be mixed is substantially constant.

If the Reynolds number of the fluids involved is maintained at a value greater than about 50, the system can deliver fluids to a mixing chamber at relatively high flow rates and the overall apparatus can deliver the mixed fluid at a relatively higher shot capacity than is available in presently available mixing apparatus.

Figure 2:
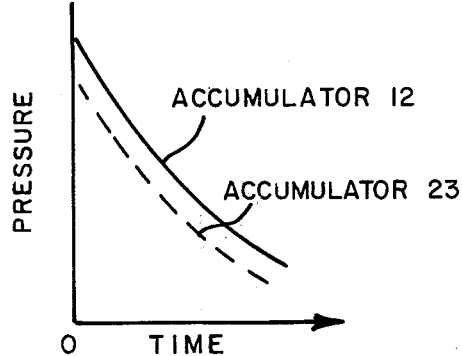
Figure 3:
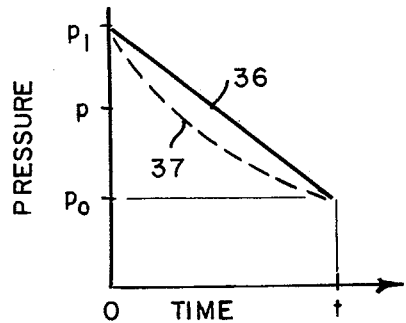
Figure 4:
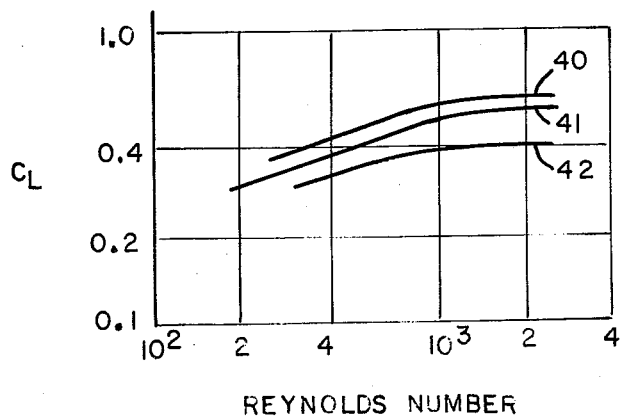

The invention can be described in more detail with the help of the accompanying drawings wherein FIG. 1 depicts a block diagram of a preferred embodiment of the system of the invention; and FIG. 2 depicts a graph qualitatively showing the relationship between the pressure vs. time characteristics of the accumulator systems used with each of the fluids being mixed by the apparatus of FIG. 1; and FIG. 3 depicts a typical pressure vs. time characteristic for an exemplary accumulator system of the apparatus of FIG. 1; and FIG. 4 depicts exemplary curves of the relationship between a dimensionless discharge coefficient $C_L$ and the Reynolds number for different nozzle sizes used in the apparatus of FIG. 1.

As can be seen in FIG. 1, a first fluid component is supplied from a source 18 thereof and a second fluid component is supplied from a source 29 thereof. Accumulators 12 and 23 associated with each fluid component are of a conventional bladder type, the bladders thereof being initially filled with an appropriate gas, such as nitrogen, at a predetermined pressure from pressure sources 13 and 24, respectively, via valves 14 and 25, respectively. The pressues therein are monitored by appropriate gauges 15 and 26, respectively. Once the accumulator bladders have been filled at the desired pressure with the selected gas, the bladders substantially fill the accumulator housings in a conventional manner. Each fluid component is thereupon supplied to its respective accumulator from the appropriate sources 18 and 29 via pumps 16 and 27 through check valves 17 and 28, respectively, and thence through fluid conveying lines 20 and 21 via branches 20A and 21A. The fluids enter the accumulators through poppet valves 31 and 32 and fill the interiors of the housings thereof external to the bladders until a sufficient supply of fluid components are retained therein. Such fluid components accordingly are maintained within the accumulators at much higher pressures than the original pressures at which the bladders were filled, such pressures being appropriately selected, as discussed in more detail below. Once the accumulators have been filled and the pumps 16 and 27 shut off, check valves 17 and 28 prevent the return of any fluids to the sources thereof. At the same time, ball valves 11, 22 and solenoid valves 19, 30 are inoperative (i.e., unopened) so that the fluid components are retained within accumulators 12 and 23 at the selected pressures, indicated by gauges 15 and 26.

When it is desired to deliver the fluid components to the mixing chamber 10, the ball valves 11 and 22 are actuated simultaneously by a pneumatic actuator 36 which may be a conventional rotary type or a linear type using a suitable linkage so that the fluids are thereupon delivered substantially at the accumulator pressure to the mixing chamber 10 simultaneously via input ports 32 and 33, respectively. Throttling valves 34, 35 are appropriately set beforehand to provide the desired pressure decay with time at the nozzles as discussed in more detail below.

In a particular embodiment, for example, the mixing device may be of the so-called impingement type, wherein the chamber is a cylindrical chamber having inputs positioned directly opposite each other near the upper region thereof. The fluids entering ports 32 and 33 impinge directly upon each other within the cylindrical chamber at high velocities, there being relatively small pressure drops from the accumulators to the input ports associated therewith. The mixture of fluids is thereupon delivered from the mixing chamber at output port 34 to an appropriate mold, for example.

When the accumulators have delivered the desired amount of the fluid mixture, the ball valves are closed and the solenoid valves 19 and 30 are opened to permit excess fluids to be returned to the sources 18 and 19 via return lines 20B and 21B, respectively.

In using the system of the invention, the pressure decay characteristics of the accumulators 12 and 23 should have substantially the same shape during the discharge operation thereof as illustrated qualitatively in the graphical representation of FIG. 2.

The decay of pressure with time, i.e., the rate at which pressure decreases at each accumulator system depends on the resistance to fluid flow in the discharge lines. While it is possible to adjust such pressure decays by changing the areas of the input ports 32 and 33 (i.e., the nozzles thereat) such nozzle sizes are usually fixed by the momenta and flow rates of the fluids that are desired at the input ports. Another more suitable method for controlling such decays of pressure with time is to throttle the flow of fluid through the line 31 supplying fluid to the ports via ball valves 11 and 22. Such throttling operation can be accomplished by placing additional full port throttling ball valves between each accumulator and its associated actuator operated ball valve as shown by throttling valves 34 and 35 in FIG. 1. Each throttling ball valve can be adjusted manually until the desired pressure decay characteristics for each accumulator and nozzle combination are achieved as shown in FIG. 2. Once the throttling valves are set, they would only have to be changed if the nozzles were changed.

After appropriate adjustment of the throttling valves, it is necessary to determine the fluid velocity characteristics at the input ports 32 and 33. This can be accomplished by conducting a series of flow rate measurements to determine discharge coefficient $C_L$ which can be used to predict the velocity of the fluid jet of each port, if the average pressure driving the fluid to produce the output shot is known.

The velocity $v$ at each port can be represented by the following expression:

$$v = C_L \sqrt{(2 \Delta P/\rho)}$$

where $C_L$ is the discharge coefficient, $\rho$ is the density of the fluid and $\Delta p$, as shown in FIG. 3, is the average pressure difference over the time period of the shot delivery, which is effectively the difference in the average pressures of the accumulator and the mixing chamber. The pressure $p_0$ is the initial gas precharge pressure in the accumulator, $p_1$ is the pressure which is achieved by pumping fluid into the accumulator. Thus, $\Delta p$ is equal to $(p_0 + p_1)/2$, if the pressure decay is assumed to be substantially linear as shown by solid line 35, which compares with an exemplary and actual pressure decay curve depicted by dashed line 37.

The discharge coefficient $C_L$ depends upon the Reynolds number of the fluid involved (the Reynolds number being defined as $\rho v d/\mu$ where $\rho$ and $v$ are defined above and $d$ is the diameter of the input port and $\mu$ is the dynamic viscosity of the fluid) and upon the input port geometry. Such relationship is depicted in the graph of FIG. 4 wherein exemplary curves 40, 41 and 42 show the relationship of $C_L$ vs. Reynolds number for input ports having various diameters $d_1$, $d_2$ and $d_3$, respectively. Such curves are determined empirically by measuring the velocities of the fluid at a known input port for average pressure at the accumulator. Once the curves of FIG. 4 are known, it is possible to design an operating system as follows.

Once the fluids to be mixed are selected, the ratio of the flow rates by weight $Q_A$ and $Q_B$ of fluids A and B are determined such ratio being recommended for such a mixture by the resin manufacturer. Thus, $Q_1 = CQ_2$ where C is a known constant. Since the flow rates by mass for each fluid can be expressed as $\rho v a$, where $\rho$ and $v$ are defined above and $a$ is the cross-sectional area of the associated input port, the flow rates can be expressed alternatively as:

$$\rho_A v_A a_A = C \rho_B v_B a_B$$

where the subscripts $A$ and $B$ identify fluids A and B, respectively. For good mixing, the momenta (i.e., $\rho v^2 a$) for each fluid should also be substantially equal, as expressed below:

$$\rho_A v^2_A a_A = \rho_B v^2_B a_B$$

If the expression for the flow rate and momenta relationships are solved simultaneously, the ratio $a_A/a_B$ of the areas of the associated input ports and the ratio $v_B/v_A$ can be expressed as follows:

$$(a_A/a_B) = (\rho_A/\rho_B) C^2$$

$$(v_B/v_A) = C$$

Since C is known from a knowledge of the fluids which are to be mixed, the above ratios can be determined. The area of one input port can be appropriately selected and from the above area ratio the area of the other input port is determined. The shot size and time during which the shot is to be delivered is determined by the particular application for which the appararatus is being used so that the total flow rate $Q_{TOTAL}$ by weight is determined. (where $Q_{TOTAL} = Q_A + Q_B$). From a knowledge of the relationship between $Q_A$ and $Q_B$, the desired flow rates of each can be specifically determined and the desired fluid velocities determined as follows:

$$(Q_A/a_A) = v_A, \text{ and}$$

$$Q_B/a_B = v_B.$$

The Reynolds number can thereupon be calculated for each of the particular known fluids and input port dimensions and from the appropriate curves of FIG. 4, the values of the discharge coefficient $C_L$ for each accumulator system can be determined. From a knowledge thereof, the average driving pressure $\Delta p_D$ for each accumulator system can be determined as follows:

$$\Delta p_{DA} = (v_A^2/C_{LA}^2)(\rho_A/2)$$

$$\Delta p_{DB} = (v_B^2/C_{LB}^2)(\rho_B/2)$$

Since the pressure $p_{CH}$ in the mixing chamber itself can be determined, or at least reasonably approximated, the overall average pressure can be determined for each accumulator as follows:

$$\Delta p_A = \Delta p_{DA} + p_{CH}, \text{ and}$$

$$\Delta p_B = \Delta p_{DB} + p_{CH}$$

From appropriate experiments which can be carried out for each accumulator, the pressure-volume characteristics of the gas in each accumulator can be determined in accordance with known gas laws wherein:

$$p_1 V_1^{1.19} = p_2 V_2^{1.19}$$

where $V_1$ and $V_2$ are the precharged and charged volumes of the gas in the accumulator and the exponent was previously determined for the specific accumulator being used by experiment.

From the above relationships for each accumulator, the precharge gas pressure and the charged gas pressure when fluid is pumped into the accumulator can be determined. In order to assure that a sufficient amount of fluid is available for the desired shot size, the charged pressure can be determined for a desired amount of fluid plus a fixed percentage in addition thereto (e.g. 10%). A specific example is provided below to describe an exemplary set of calculations required to set up an apparatus in accordance with the invention.

In such an example, it is desired to mix two fluid plastic components, polyol and isocyanate, having the following characteristics and recommended flow rates by weight ratio for good mixing.

$\rho = 2.04$ slugs/ft.$^3$
Specific Gravity = 1.05 (polyol)
$\mu_i$ (at 80° F) = 750 cp.
$\rho_i = 2.37$ slugs/ft.$^3$
Specific Gravity = 1.22 (isocyanate)
$\mu_p$ (at 130° F) = 450 cp.
$Q_p = 1.94 Q_i$ The ratio $a_p/a_i$ of the areas of the input ports is calculated as:

$$(a_p/a_i) = (\rho_i/\rho_p) C^2 = 4.38$$

If the diameter $d_p$ of the input port for the polyol is set at 0.425 in. the diameter $d_i$ of the input port for the isocyanate is 0.203 in. The shot size and time duration are selected as 10 lbs. for 1 second. Thus, the flow rates by weight of the fluids are determined as $$Q_p = 6.60 \text{ lb./sec.}$$

$$Q_i = 3.40 \text{ lb./sec.}$$

or $$Q_p = 1.01 \times 10^{-1} \text{ ft.}^3/\text{sec.}$$

$$Q_i = 4.47 \times 10^{-2} \text{ ft.}^3/\text{sec.}$$

The velocities can then be calculated [( i.e., $v = (Q/a)$] for each fluid component as:

$$v_p = 102 \text{ ft./sec.}$$

$$v_i = 100 \text{ ft./sec.}$$

Accordingly, the Reynolds numbers Re, $(\rho v d/\mu)$ can be calculated for each fluid and associated input port as $$R_{ep} = 788$$

$$R_{ei} = 510$$

and from appropriate curves of $C_L$ vs. Re for specific port dimensions (as exemplified by the curves of FIG. 4) discharge coefficients $C_L$ can be determined:

$$C_{Lp} = 0.40$$

$$C_{Li} = 0.40$$

From such values the average driving pressures $\Delta p_{DP}$ and $\Delta p_{Di}$ are calculated as:

$$\Delta p_{DP} = 463 \text{ psi}$$

$$\Delta p_{Di} = 2040 \text{ psi}$$

Adding the chamber pressure $p_{CH}$ (e.g., an exemplary chamber pressure of 75 psi) to each of the above average drive pressures provides average overall pressure $\Delta p_p$ and $\Delta p_i$ as $$\Delta p_p = 538 \text{ psi}$$

$$\Delta p_i = 2115 \text{ psi}$$

For specific accumulators, for example, the fluid volumes required are:

$$V_p = [6.6(1728)/(62.4)1.05] = 174 \text{ in.}^3$$

$$V_i = [3.4(1728)/(62.4)1.22] = 77.2 \text{ in.}^3$$

Allowing 10% excess fluid, the desired fluid volumes to be used are:

$$V_p = 191 \text{ in.}^3$$

$$V_i = 84.9 \text{ in.}^3$$

If the pre-charged gas volume $V_{1p}$ and $V_{1i}$ in each accumulator is 1095 in.$^3$, the required charged gas volume $V_{2p}$ and $V_{2i}$ in each accumulator are:

$$V_{2p} = 904 \text{ in.}^3$$

$$V_{2i} = 1010 \text{ in.}^3$$

In accordance with the pressure-volume characteristics of each accumulator, the relationship between the charged and pre-charged pressres in each can be determined as:

$$p_{1p} = 0.796\, p_{2p}$$

$$p_{1l} = 0.908\, p_{2l}$$

From the above knowledge of the average accumulator pressures, $\Delta p_p$ and $\Delta p_l$, the pre-charged gas pressures $p_{1p}$ and $p_{1l}$ and the charged gas pressures $p_{2p}$ and $p_{2l}$ are calculated as $$p_{1p} = 477 \text{ psi}$$

$$p_{2p} = 599 \text{ psi}$$

$$p_{1l} = 2010 \text{ psi}$$

$$p_{2l} = 2220 \text{ psi}$$

It can also be seen that the momenta ($pv^2a$) for each fluid component at its associated input port as expressed below, are substantially equal as desired.

$$\rho_p v_p^2 a_p = 20.9$$

$$\rho_l v_l^2 a_l = 21.1$$

As can be seen by the above discussion of the design parameters required and the sample calculation for a specific example, the apparatus of the invention permits the shot size to be continuously varied using the same basic apparatus by appropriately varying the pressure involved and the ratio of the port dimensions over a wide range of shot sizes and shot durations.

Since it is helpful to control the dynamic viscosities of the fluids, which are known at specific temperatures, it is desirable to maintain such temperatures for the fluids in each of the accumulators. One method for doing so can be implemented by the placement of appropriate heaters around the region of the accumulators where the fluid is located when charged, as shown by heaters 45 and 46 associated with accumulators 12 and 23, respectively. Such heaters may be in the form of conventionally known silicon rubber heating bands suitably attached to the exterior of the accumulators, which heaters are controlled by appropriate thermostats (not shown) so that the dynamic viscosity of the fluid components at the input ports is appropriately controlled. The overall accumulator and heater structure can be suitably insulated as shown diagrammatically by insulators 47 and 48, respectively.

Since substantially the only energy expended in operating the apparatus of the invention arises in loading the accumulators with the fluid components up to the desired charged pressures, such charging can be achieved with an appropriate pump requiring only a relatively small motor (e.g. a few horse power) and, there is no need for continuously pumping (and continuously expending energy) when performing the fluid delivery and mixing operation as in previously used devices. Hence, the overall energy expended is lower than that required for previous apparatus.

Since the particular components of the system are well known to those in the art, further detailed descriptions thereof are not required to explain the structure and operation of the apparatus of the invention. Thus, the accumulators can be of the type made and sold (for example) by Greer-Olaer Products Division of Greer Hydraulics Co. of Los Angeles, Calif. and are readily available for pressures up to 6000 psi, or can be specifically designed for higher pressures, if desired. The various valves and pumps used in the apparatus also are readily available from many manufacturers thereof, and are well known to those in the art.

While the system has been described using fluid plastic materials the apparatus of the invention can be utilized with other fluid component combinations in accordance with the principles described above and the system operation and configuration can be extended to mix more than two fluid components, if desired. In the latter instance, the proportional relationship among the parts by weight of the fluid components and the flow rates thereof are maintained constant and the design criteria described above for use with two fluid components can be readily extended to a number of fluid components greater than two.

We claim:

1. A system for mixing at least two fluid components, said system comprising
    at least two sources for providing at least two different fluid components;
    at least two accumulator means;
    means for supplying under pressure to each of said accumulator means a different one of said fluid components from said fluid component sources, said accumulator means each thereby being independently charged to a selected predetermined pressure;
    a mixing device having at least two input ports for receiving said at least two fluid components and at least one output port for delivering a mixture of said at least two fluid components therefrom; and
    means associated with each of said accumulator means for independently controlling the mass flow rates of each of said fluid components being supplied to said mixing device from each of said accumulator means, said controlling means being operable to supply said at least two fluid components from said accumulator means substantially simultaneously to said mixing device.

2. A system in accordance with claim 1 wherein each of said controlling means includes independent pressure adjustment means associated with each of said accumulator means for setting the predetermined pressures to which said accumulator means are charged, said predetermined pressures and the ratio of the sizes of said input ports being selected so as to provide substantially equal momenta and a substantially constant ratio of the mass flow rates of the fluid components at said input ports, and further to provide Reynolds numbers for each of the fluid components at said input ports which are equal to or greater than about 50.

3. A system in accordance with claim 1 wherein each of said controlling means comprises a fast acting valve means positioned between its associated accumulator means and one of said input ports, said valve means when opened providing a fluid conveying path from said associated accumulator means to said input ports whereby said fluid components are supplied to said input ports from said accumulator means.

4. A system in accordance with claim 3 and further including means for controlling the pressure loss characteristics of the fluid components from the accumulator means to the input ports so that the pressure decay characteristics of each accumulator means are controlled over the time period when said fluid components are delivered to said mixing device.

5. A system in accordance with claim 4 wherein said controlling means provides for substantially similarly shaped pressure decay characteristics at each said accumulator over said time period.

6. A system in accordance with claim 3 and further including means for controlling the return of fluid components from said accumulator means of said fluid components sources.

7. A system in accordance with claim 6 wherein said return control means includes a check valve for preventing the return of said fluid components from said accumulator means when said accumulator means have been charged to said predetermined pressure by said fluid components supplying means.

8. A system in accordance with claim 6 wherein said return control means further includes valve means for permitting the return of said fluid components from said accumulator means to said fluid component sources.

9. A method of mixing at least two fluid components comprising the steps of
storing, under selected predetermined pressures, finite volumes of at least two different fluid components obtained from corresponding sources thereof;
supplying said at least two stored fluid components substantially simultaneously over a preselected time period to a mixing device;
independently controlling the mass flow rates of said fluid components being supplied to said mixing device; and
mixing said fluid components to form a mixture thereof at said mixing device.

10. A method in accordance with claim 9 and further including the steps of
independently controlling the pressure loss characteristics of the fluid components which are supplied to said mixing device so that the pressure decay characteristics of said stored fluid components over said preselected time period are substantially similar for each said fluid component.

11. A method in accordance with claim 9 and further including the step of
selecting the ratio of the dimensions of said input ports and the predetermined pressures under which each of said fluid components are stored so as to provide, at said mixing device, substantially equal momenta of said at least two fluid components, a substantially constant ratio of the mass flow rates of said at least two fluid components and Reynolds numbers for each of said at least two fluid components which are equal to or greater than about 50.

12. A method in accordance with claim 11 and further including the step of returning the portions of the fluid components not supplied to said mixing device over said preselected time period to their corresponding sources.

13. A method in accordance with claim 12 and further including the step of preventing said stored fluid components from returning to their corresponding sources while they are so stored under pressure and during the preselected time period during which they are being simultaneously supplied to said mixing device.

* * * * *